United States Patent [19]
von Bun et al.

[11] Patent Number: 5,020,743
[45] Date of Patent: Jun. 4, 1991

[54] NANO-G RESEARCH LABORATORY FOR A SPACECRAFT

[75] Inventors: Friedrich O. von Bun, Silver Spring, Md.; Owen K. Garriott, Madison, Ala.

[73] Assignee: The United States of America as represented by the Administrator of the National Aeronautics and Space Administration, Washington, D.C.

[21] Appl. No.: 344,872

[22] Filed: Apr. 28, 1989

[51] Int. Cl.$^5$ .............................................. B64G 1/42
[52] U.S. Cl. .................................................... 244/159
[58] Field of Search ................... 244/158 R, 159, 163

[56] References Cited

U.S. PATENT DOCUMENTS

| | | | |
|---|---|---|---|
| 3,369,770 | 2/1968 | Cohlan | 244/1 |
| 3,534,926 | 10/1970 | Wuenscher | 244/159 |
| 3,785,595 | 1/1974 | Fischell | 244/1 |
| 4,408,740 | 10/1983 | Kleber | 244/158 R |
| 4,896,849 | 1/1990 | Moynihan | 244/158 R |

OTHER PUBLICATIONS

Friedrich O. von Bun, Owen K. Garriott and Don J. Pearson, "Nano-g Environment on the Orbiter or Space Station", May 1988; pp. 579-583, published in *Acta Astronautica*, vol. 17, No. 5.

*Primary Examiner*—Richard W. Wendtland
*Attorney, Agent, or Firm*—R. Dennis Marchant; Harold W. Adams; Paul S. Clohan, Jr.

[57] ABSTRACT

An acceleration free research laboratory is provided that is confined within a satellite but free of any physical engagement with the walls of the satellite, wherein the laboratory has adequate power, heating cooling and communications services to conduct basic research and development.

An inner part containing the laboratory is positioned at the center-of-mass of a satellite within the satellite's outer shell. The satellite is then positioned such that its main axes are in a position parallel to its main axes are in a position parallel to its flight velocity vector or in the direction of the residual acceleration vector. When the satellite is in its desired orbit, the inner part is set free so as to follow that orbit without contacting the inside walls the outer shell. Sensing means will detect the position of the inner part with respect to the outer shell, and activate control rockets to move the outer shell and thereby reposition the inner part such that it is correctly positioned at the center-of-mass of the satellite. As a consequence, all disturbing forces, such as drag forces, act on the outer shell, and the inner part containing the laboratory, is shielded and is affected only by gravitational forces. Power is supplied to the inner part and to the laboratory by a balanced microwave/laser link; therefore, any radiation pressures created by the operation of this link will be cancelled by the diametrically opposed transmissions, making the net effect of any acceleration created $10^{-9}$ g. or less. This kind of environment is necessary for basic research to study critical phenomena such as the Lambda transition in helium, crystal growth, perform special metals and alloys research, etc.

12 Claims, 2 Drawing Sheets

NANO-G RESEARCH LABORATORY FOR A SPACECRAFT

ORIGIN OF THE INVENTION

The invention described herein was made by an employee of the United States Government and another and may be manufactured and used by or for the Government for governmental purposes without the payment of any royalties thereon or therefore.

FIELD OF THE INVENTION

The present invention relates generally to an apparatus that will create a acceleration free laboratory environment inside a spacecraft. More specifically, a floating table or laboratory that can achieve a nano-g environment on board a satellite that can be launched in a specific orbit or kept in the vicinity of the Orbiter or Space Station for a time period long enough to perform low-g experiments is disclosed.

BACKGROUND OF THE INVENTION

One of the principal reasons for going into space is to reach a near acceleration-free (microgravity) environment. To achieve the lowest level of microgravity, say below $10^{-9}$ g, it is not only necessary to limit or isolate local disturbances to an experiment caused by the crew motion, thrusters, vibration, etc., but it is also necessary to account for gravity gradient forces, inertial rotation and atmospheric drag. Many research tasks in materials science, fluid dynamics and other disciplines may heed the lowest acceleration levels available. To reach acceleration levels as low as $10^{-8}$ to $10^{-9}$ g (or lower)=$10^{-7}$ to $10^{-8}$ (m/s$_2$) for very long periods of time, it is necessary to isolate the experiment from local transient perturbations. It is also necessary to locate the experiment near the spacecraft center-of-mass, as gravity gradient forces plus inertial rotation produce additional accelerations.

It is known that a compensation system exists for a satellite comprising a levitating body within the satellite, the position of the body relative to the satellite housing being determined by a sensing device. Subject to the position of the body inside the satellite, the sensing device controls thrusters correcting the position of the satellite in that the body always remains in a specific desired position relative to the satellite. Thus the compensation system serves for adapting the total satellite to the position of the levitating body so that the position of the satellite in the orbit is foreseeable and the satellite can be used for the purposes of navigation for geophysical functions. However, this has not been done for the purpose of conducting extreme low-g research because there was no way to supply power for heating, cooling and communicating with the levitating body without inducing external pressure such as radiation pressure upon the levitating body thereby inducing accelerations in excess of $10^{-9}$ to $10^{-10}$ g.

It is also known that there is an apparatus that will reduce or eliminate nearly completely the residual acceleration of a body within a manned spacecraft by use of a system by which scanning units monitoring the position of the body relative to a protection box (enclosing the body) moving together with the body, control driving means which are not provided directly at the protection box but at components of the spacecraft. However, the protection box and/or body in this instance are battery powered and have no means of providing the power required to operate a space laboratory equipped with heating, cooling and communications (telemetry, video, etc.) services for several hours or even several days.

SUMMARY OF THE INVENTION

It is therefore an object of the present invention to provide an extremely low acceleration ($10^{-8}$ g to $10^{-9}$ g) laboratory environment for conducting research and development.

It is another an object of the present invention to provide a laboratory environment together with adequate power, heating, cooling and communications (such as telemetry, video, etc.) services under conditions of extremely low acceleration, $10^{-8}$ g to $10^{-9}$ g, required for conducting basic research and development.

It is another object of the present invention to provide an improved apparatus that will enable almost complete elimination of the residual acceleration of a laboratory positioned within a manned spacecraft/space station while complying with the safety conditions for the crew.

It is still a further object of the invention to provide a substantially acceleration free research environment, i.e., to study critical phenomena such as the Lambda transition in helium, crystal growth, perform special metals and alloys research, etc.

The foregoing and other objects are accomplished by providing an acceleration free floating laboratory confined within a satellite but free of any physical engagement with the walls of the satellite, wherein the laboratory has adequate power, heating, cooling and communications services to conduct basic research and development.

An inner part, the satellite laboratory, is positioned at the center-of-mass of a satellite within the satellite's outer shell. The satellite is then positioned such that its main axis is in a position parallel to its flight velocity vector. When the satellite is in its desired orbit, the inner part is set free so as to follow that orbit without contacting the inside walls the outer shell. Sensing means will detect the position of the inner part with respect to the outer shell, and activate control rockets to move the outer shell and thereby reposition the inner part such that inner part is correctly positioned at the center-of-mass of the satellite. As a consequence, all disturbing forces, such as drag forces, act on the outer shell, and the inner part, the laboratory, is shielded and is affected only by gravitational forces. Power is supplied to the laboratory by a balanced microwave/laser link; therefore, any radiation pressures created by the operation of the link will be cancelled by the diametrically opposed electromagnetic transmissions, making the net effect of any acceleration created $10^{-9}$ g to $10^{-10}$ g or less. This kind of environment is necessary for basic research to study critical phenomena such as the Lambda transition in helium, crystal growth, perform special metals and alloys research, etc.

DETAILED DESCRIPTION OF THE PREFERRED EMBODIMENT

Figure 1:
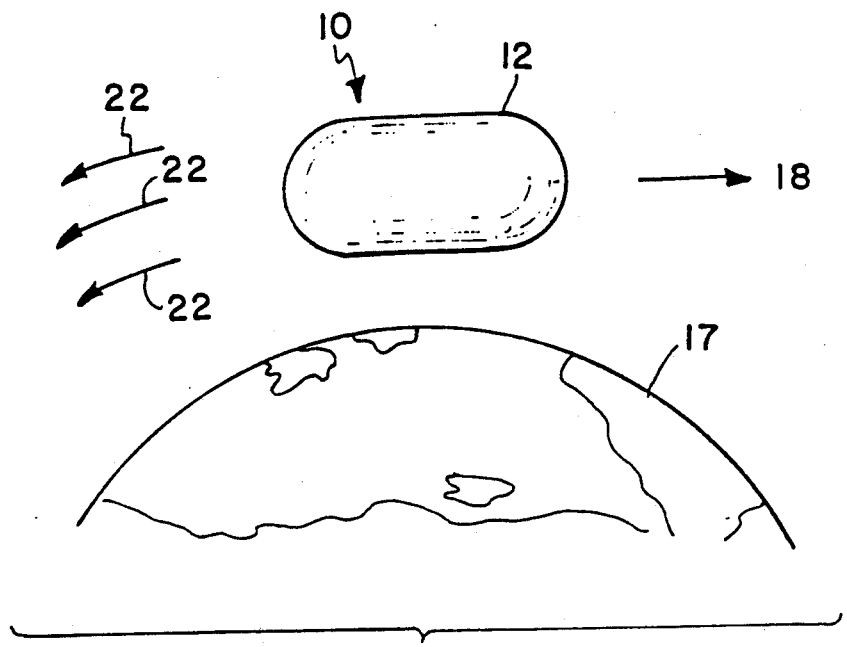
FIG. 1 is a pictorial view of a satellite orbiting the earth useful in explaining the basic principles involved in providing a nano-g spacecraft.
Figure 2:
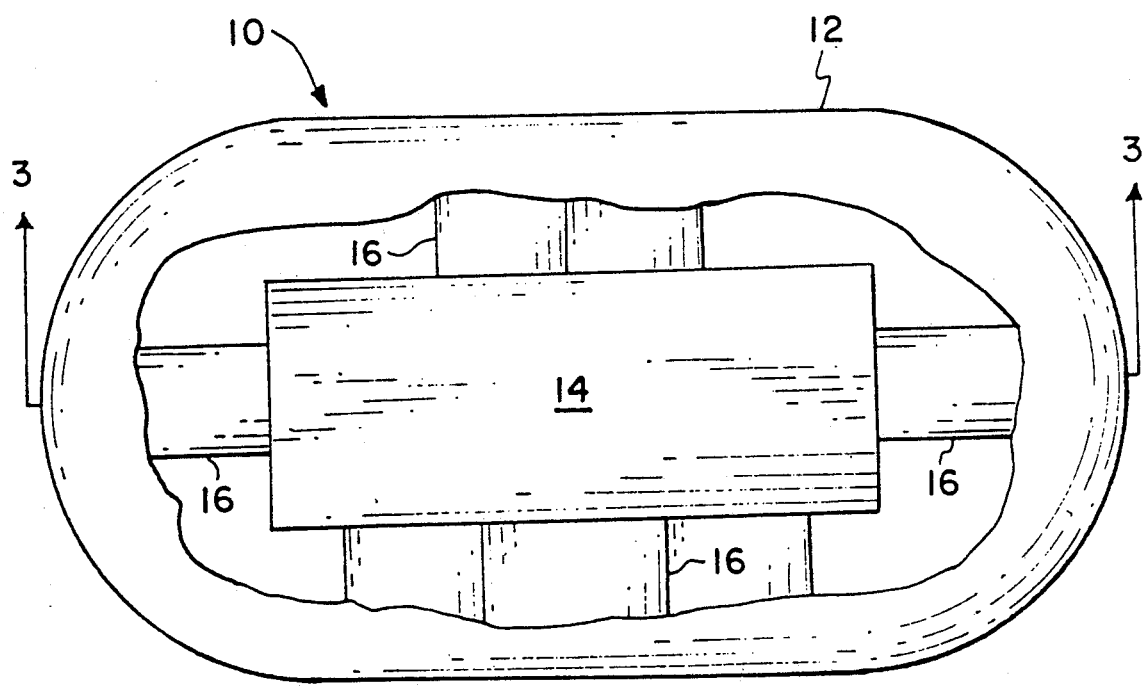
FIG. 2 is a perspective cut-away view of the nano-g spacecraft of this invention.

The satellite or spacecraft for the preferred embodiment of this invention is shown generally at 10 in FIGS. 1 and 2. The spacecraft is comprised of an outer part 12 surrounding an inner part 14, which will become an acceleration free floating laboratory. During the launching of the satellite 10, inner part 14 may be held in symmetrical relationship with respect to the outer shell 12 by a series of retractable spokes 16, as is disclosed by Cohlan in U.S. Pat. No. 3,369,770, the disclosure of which is hereby incorporated by reference. After the satellite 10 has been launched into orbit, such as in the direction of the arrow 18 relative to the earth 17, the supporting mechanism 16 can then be retracted to release inner part 14 by any suitable control means such as a radio signal such that inner part 14 will be in free orbit within outer shell 12.

It will be clear from the foregoing that the inner part 14 is subject substantially only to the force of gravity. Outer shell 12, on the other hand, is subject both to the force of gravity and drag forces as indicated schematically by arrows 22, and other forces such as solar pressure and possibly magnetic fields, etc. As a consequence, inner part 14 will have a tendency to move forward within the outer shell 12 in the direction of the arrow 18 and thus eventually collide with the forward inner side wall of outer shell 12. This collision between inner part 14 and outer shell 12 can be prevented by precisely controlling the initial release conditions of the outer shell 12 and inner part 14 as is disclosed in a publication entitled, "Nano-g Environment on the Orbiter or Space Station" which was authored by the inventors, Friedrich O. von Bun and Owen K. Garriott, and Don J. Pearson, published in *Acta Astronautica*, Vol. 17, No. 5, pp 579–583, May 1988, the disclosure of which is hereby incorporated by reference.

In order to prevent collision between outer shell 12 and inner part 14, outer shell 12 includes a propulsion means to overcome drag forces 22 and other external forces acting upon outer shell 12 and retain outer shell 12 in a symmetrical or concentric relationship with inner part 14 maintaining inner part 14 near the spacecraft center-of-mass. Then the entire satellite system would move as though it were subject substantially only to the force of gravity and thus follow a true gravitational orbit. Control rockets 24 are mounted onto outer shell 12 to provide the propulsion means, and are activated whenever needed, either in a pulsed fashion or continuous fashion, to prevent inner part 14 from colliding with the inside walls of outer shell 12.

Figure 3:
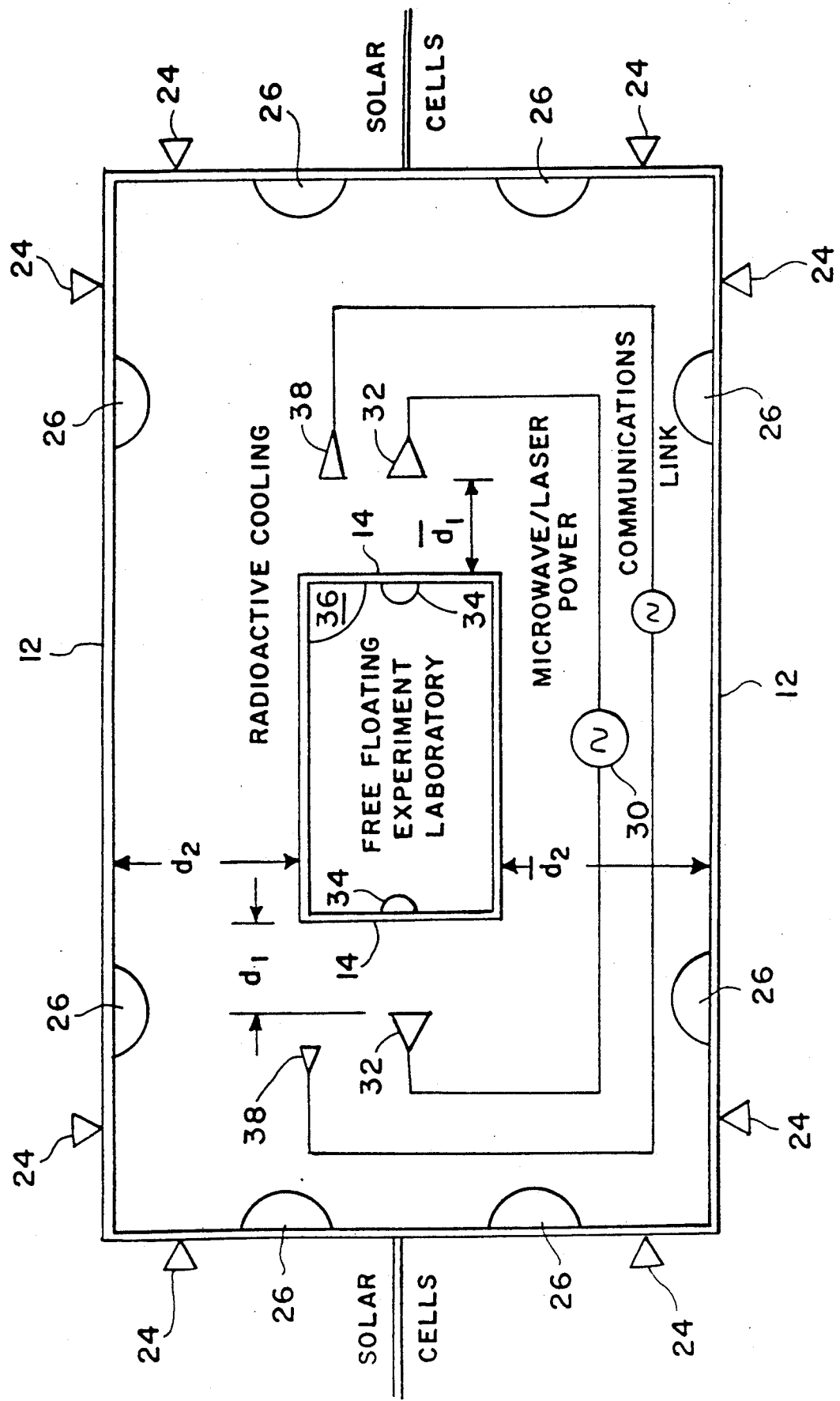
FIG. 3 is a cross view of the nano-g spacecraft taken along line 3—3 of FIG. 2.

Referring now to FIG. 3, sensors 26 are placed about the inside walls of outer shell 12 which detect the position of inner part 14 within outer shell 12. If inner part 14 floats or moves away from the center-of-mass of outer shell 12, or if inner part 14 moves too close to an inside wall of outer shell 12, the sensors 26 will detect the position of inner part 14 and activate control rockets 24 to properly reposition inner part 14 within outer shell 12. FIG. 3 illustrates a two dimensional schematic of the satellite system; however, it should be understood that this is a three dimensional system and that the vertical arrangement of the control rockets, sensors, etc. are not shown.

A unique feature of this spacecraft is the capability it possesses for conducting basic research and development at very low acceleration conditions ($10^{-8}$ to $10^{-9}$ g). This is made possible by the method that power is supplied to the laboratory 28 located inside of inner part 14. The power source in the preferred embodiment is a microwave/laser source 30, shown in FIG. 3, that transmits or radiates its energy by way of microwave/laser link 32 to receiving source 34 located on inner part 14. However, the power source could be a laser or any other suitable means of power. It is significant to note here that the microwave laser/link 32 is a "balanced" link transmitting equal power from each of the two radiating components. This balanced link arrangement is very crucial to the successful operation of the nano-g spacecraft because radiation pressure and acceleration will result from the transmission of the radiation from the microwave/laser link 32. However, if equal amounts of radiation are transmitted from each side and the system is symmetrically shaped, the net effect is that the pressures will cancel out one another thereby not inducing accelerations greater than $10^{-9}$ g. In addition, a communications link 38 is also mounted inside of outer shell 12 to provide communications services thereby enabling audio, video, telemetric, robotic, remote, etc. communication with said laboratory chamber.

On board inner part 14 also are facility services 36 which can be heating and cooling systems for laboratory 28, an evacuation means for evacuating laboratory 28, and communications services for audio, video, telemetric, robotic, remote, etc. communication with laboratory 28. The facility services 36 could also include a rechargeable battery that could be utilized for specialized tasks whenever power requirements are low.

In the beginning of the operation of the spacecraft prior to launch, inner part 14 is positioned mechanically at the center-of-mass of the satellite 10 within outer shell 12. This will be done by a support mechanism 16 arrangement to secure inner part 14 in place. Satellite 10 is then positioned such that its main axes are in a position parallel to the flight velocity vector or in the direction of the residual acceleration vector. This is done because it minimizes the acceleration gradient forces by utilizing the fact that these forces are smallest when the sample (experiment) parallel to the flight velocity vector. When satellite 10 is in the desired orbit, inner part 14 is set free so as to follow that orbit without contacting the inside walls of outer shell 12. Sensing means 26 will detect the position of inner part 14 with respect to outer shell 12, and activate control rockets 24 to move outer shell 12 and thereby reposition inner part 14 such that inner part is correctly positioned at the center-of-mass of satellite 10. As a consequence, all disturbing forces, such as drag forces, act on the outer shell 12, and the inner part 14, the laboratory 28, is shielded and is affected only by gravitational forces. Since power is supplied to inner part 14 and to laboratory 28 by the balanced microwave/laser link 32, any radiation pressures created by the operation of microwave link 32 will be cancelled by the diametrically opposed microwave transmissions, making the net effect of any acceleration created $10^{-9}$ g or less. Thus, a research laboratory almost free of accelerations can be created for conducting basic research and development which can under no circumstances be accomplished on earth.

By providing the nano-g research laboratory for a spacecraft as is disclosed herein, it is now possible to provide a laboratory environment together with adequate power, heating, cooling and communications (such as telemetry, video, etc.) services of extremely low acceleration, $10^{-8}$ to $10^{-9}$ g, required for basic research and development.

It will be understood by those skilled in the art that the embodiments shown and described are only exemplary and that various modifications can be made in the practice of the invention within the scope of the appended claims.

What is claimed is:

1. A spacecraft that will provide an extremely low acceleration laboratory environment for conducting research and development comprising, in combination:
   an outer shell;
   an inner part, the laboratory, surrounded by said outer shell, and free of any physical engagement with said outer shell;
   means for sensing the position of said inner part with respect to said outer shell;
   means for changing or correcting the position of said inner part with respect to said outer shell;
   means for providing power to said inner part.

2. The spacecraft as recited in claim 1 wherein said laboratory environment includes adequate power, heating, cooling and communications services under said conditions of extremely low acceleration (order of $10^{-9}$ g) for conducting said research and development.

3. A spacecraft that will provide a laboratory environment including adequate power, heating, cooling and communications services under conditions of extremely low acceleration (order of $10^{-8}$ g to $10^{-9}$ g) required for conducting basic research and development comprising, in combination:
   an outer shell;
   an inner part surrounded by said outer shell, and free of any physical engagement with said outer shell;
   means for sensing the position of said inner part with respect to said outer shell;
   means for changing or correcting the position of said inner part with respect to said outer shell;
   means for providing power to said inner part.

4. The spacecraft as recited in claim 3 wherein said means for providing power to said inner part is a microwave/laser link that transmits energy by radiation to said inner part.

5. The spacecraft as recited in claim 4 wherein said microwave/laser link comprises at least two diametric opposed transmission sources symmetrically surrounding said inner part, wherein equal or identical power is transmitted by each said source thereby balancing and in effect cancelling any acceleration induced by radiation pressure created by said power transmission to said inner part.

6. The spacecraft as recited in claim 5 wherein said means for changing or correcting the position of said inner part with respect to said outer shell comprises a propulsion means coupled to said outer shell, said propulsion means being controlled by and responsive to said sensing means.

7. The spacecraft as recited in claim 6 wherein said propulsion means are control rockets that are symmetrically disposed about said outer shell.

8. The spacecraft as recited in claim 7 wherein said inner part includes a symmetrically constructed, free floating laboratory chamber.

9. The spacecraft as recited in claim 8 wherein said laboratory chamber includes means for heating, cooling and evacuating said laboratory chamber.

10. The spacecraft as recited in claim 9 wherein said outer shell includes a communications link thereby enabling audio, video, telemetric, robotic, remote, etc. communication with said laboratory chamber.

11. The spacecraft as recited in claim 3 wherein said means for providing power to said inner part is a laser link comprised of at least two transmission sources symmetrically surrounding said inner part, wherein equal or identical power is transmitted by each said source thereby balancing and in effect cancelling any acceleration induced by radiation pressure created by said power transmission to said inner part.

12. The spacecraft as recited in claim 10 wherein said communications link comprises at least two diametric opposed transmission sources symmetrically surrounding said inner part, wherein equal or identical power is transmitted by each said source thereby balancing and in effect cancelling any acceleration induced by radiation pressure created by said power transmission to said inner part.

* * * * *